US012346461B2

(12) United States Patent
Chamon et al.

(10) Patent No.: US 12,346,461 B2
(45) Date of Patent: Jul. 1, 2025

(54) BOOLEAN FUNCTION CONTROL GATES FOR SECURELY EXECUTING ON A PUBLIC COMPUTER CODE THAT OPERATES ON ENCRYPTED DATA

(71) Applicant: USEncryption Inc., Orlando, FL (US)

(72) Inventors: Claudio Chamon, Orlando, FL (US); Jonathan Jakes-Schauer, Orlando, FL (US)

(73) Assignee: USEncryption Inc., Orlando, FL (US)

( * ) Notice: Subject to any disclaimer, the term of this patent is extended or adjusted under 35 U.S.C. 154(b) by 226 days.

(21) Appl. No.: 18/005,059

(22) PCT Filed: Jul. 23, 2021

(86) PCT No.: PCT/US2021/070938
§ 371 (c)(1),
(2) Date: Jan. 11, 2023

(87) PCT Pub. No.: WO2022/020857
PCT Pub. Date: Jan. 27, 2022

(65) Prior Publication Data
US 2024/0037249 A1 Feb. 1, 2024

Related U.S. Application Data

(60) Provisional application No. 63/055,703, filed on Jul. 23, 2020.

(51) Int. Cl.
*G06F 21/60* (2013.01)
*G06F 21/54* (2013.01)
*G06F 21/62* (2013.01)

(52) U.S. Cl.
CPC ............ *G06F 21/602* (2013.01); *G06F 21/54* (2013.01); *G06F 21/6209* (2013.01)

(58) Field of Classification Search
CPC .... G06F 21/54; G06F 21/602; G06F 21/6209; G06F 21/72; G06F 21/6245; G09C 1/00;
(Continued)

(56) References Cited

U.S. PATENT DOCUMENTS 8,130,949 B2 * 3/2012 Pinder ................... H04L 9/0869
380/259
2011/0211692 A1 * 9/2011 Raykova ................. H04L 9/008
380/46

(Continued)

FOREIGN PATENT DOCUMENTS

WO     WO-2019126044 A1 *  6/2019   ............. G06F 21/12

OTHER PUBLICATIONS

Garipelly, Raghava, P. Madhu Kiran, and A. Santhosh Kumar. "A review on reversible logic gates and their implementation." International Journal of Emerging Technology and Advanced Engineering 3.3: 417-423. (Year: 2013).*

(Continued)

*Primary Examiner* — John M MacIlwinen
(74) *Attorney, Agent, or Firm* — Wolter Van Dyke Davis, PLLC; Eugene J. Molinelli

(57) ABSTRACT

Techniques, for secure processing of encrypted data on public resources, include receiving first data, indicating a sequence of reversible Boolean function control (BFC) gates, including a first segment for decrypting, a second segment for operating on the decrypted data, and a third segment for encrypting the resulting data. Second data indicates generic BFC gate rules for replacing a first sequence of two gates operating on an input N-bit word with a second sequence of one or more gates that produce the same output N-bit word. The second data is used to propagate: a gate from the first segment a distance into the second segment or beyond; and, a gate from the third segment a
(Continued)

distance into the second segment or before. This produces an obfuscated sequence of reversible gates. Obfuscated instructions based on the obfuscated sequence of gates are sent to the public resources.

20 Claims, 10 Drawing Sheets

(58) Field of Classification Search
CPC . H04L 9/008; H04L 9/0631; H04L 2209/046; G06N 10/00; G06N 10/20
See application file for complete search history.

(56) References Cited

U.S. PATENT DOCUMENTS

| | | | |
|---|---|---|---|
| 2020/0202250 A1* | 6/2020 | Roetteler | G06N 10/00 |
| 2022/0231844 A1* | 7/2022 | Berend | G06N 10/00 |
| 2022/0284132 A1* | 9/2022 | Blanton | G06F 21/72 |

OTHER PUBLICATIONS

Markus Grassl, et al., Applying Grover's Algorithm to AES: Quantum Resource Estimates; Feb. 4, 2016 (Feb. 4, 2016), SAT 2015, 18th International Conference, Austin, TX,; USA, Sep. 24-27, 2015; Lecture Notes in Computer Science; Lect.Notes Computer],Springer, Berlin, Heidelberg, p. 29-43.
Mazonka Oleg, et al.; : "Practical Data-in-Use Protection Using Binary Decision Diagrams", IEEE Access, IEEE, USA, vol. 8, Jan. 27, 2020 (Jan. 27, 2020), pp. 23847-23860.

* cited by examiner

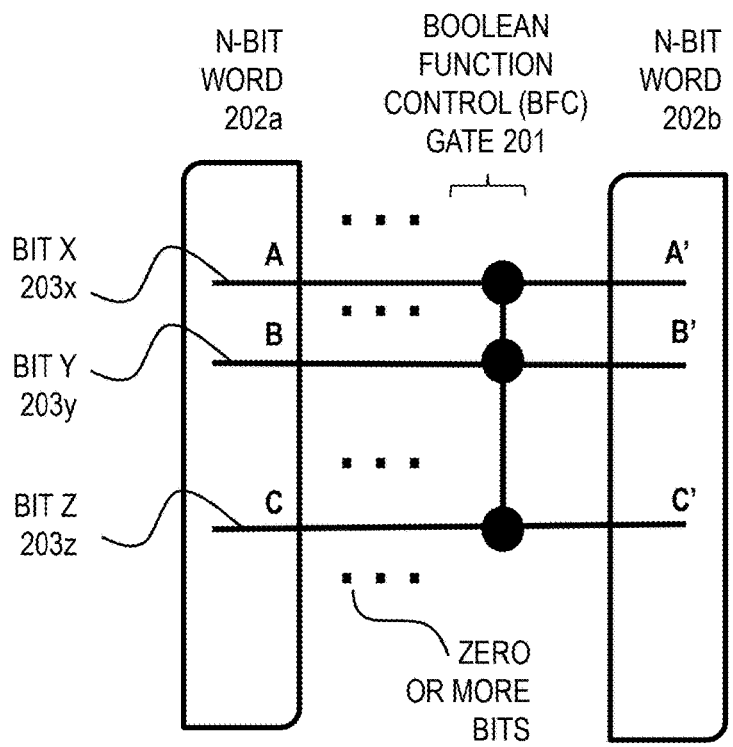
FIG. 2A
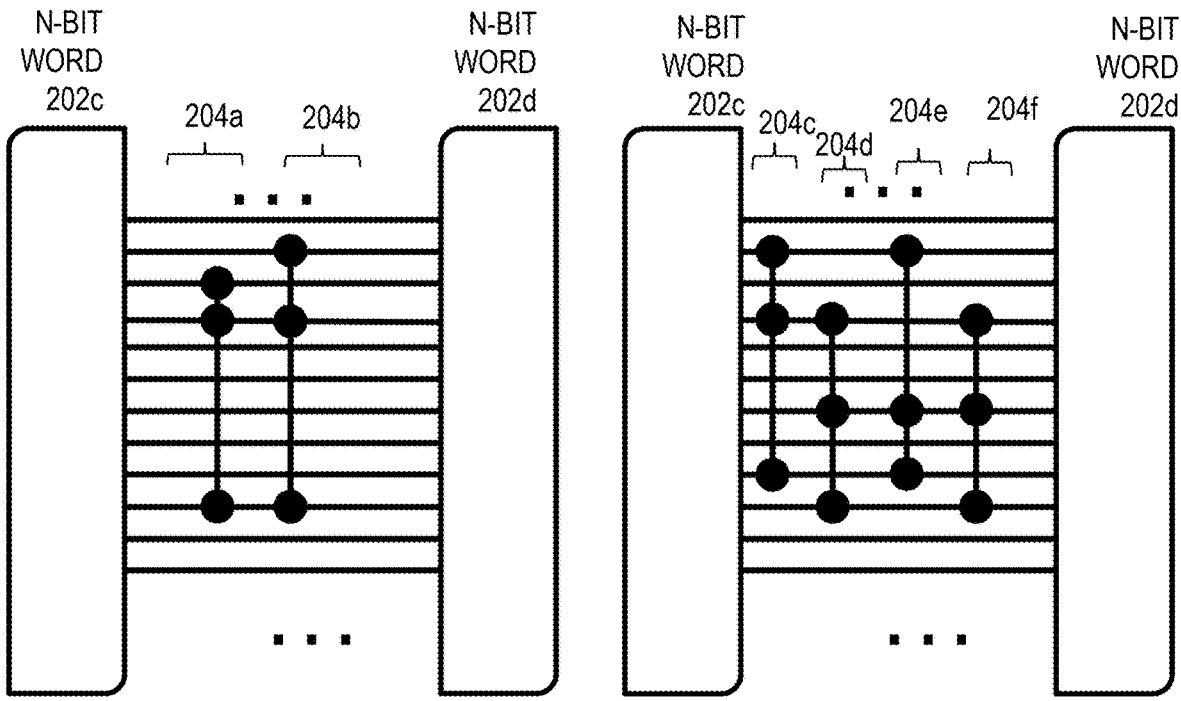
FIG. 2B
FIG. 2C

FIG. 5A $$B'_{12} = B_1 \oplus B_2$$

FIG. 5B $$B'_2(\ldots, x_{t_1}, \ldots) = B_2(\ldots, x_{t_1} \oplus B_1, \ldots)$$

$B_1^* = [B_1(x_{t_2} = 0) \oplus B_1(x_{t_2} = 1)]$
$B_1^0 = B_1(x_{t_2} = 0)$ $B_2^* = [B_2(x_{t_1} = 0) \oplus B_2(x_{t_1} = 1)]$
$B_2^0 = B_2(x_{t_1} = 0)$ $B_1'' = (x_{t_2} \oplus B_2^0) B_1^*$
$B_2'' = (x_{t_1} \oplus B_1^0) B_2^*$
$B_{12}'' = B_1(x_{t_2} \to B_2^* x_{t_2})$
$B_{21}'' = B_2(x_{t_1} \to B_1^* x_{t_1})$ $B_1'(\ldots, x_{t_2}, \ldots) = B_1(\ldots, x_{t_2} \oplus B_2, \ldots) = B_1(x_{t_2} \to x_{t_2} \oplus B_2)$ $$B_2^* = [B_2(x_{t_1} = 0) \oplus B_2(x_{t_1} = 1)] \qquad B_2'(\ldots, x_{t_1}, \ldots) = B_1 B_2^*$$

$$B_1'' = (x_{t_2} \oplus B_2^0) B_1^* = B_1(x_{t_2} \to x_{t_2} \oplus B_2^0) \oplus B_1^0$$

$$B_{21}'' = B_2(x_{t_1} \to B_1^* x_{t_1})$$

$$B_{12}'' = B_1(x_{t_2} \to B_2^* x_{t_2})$$

$$B_2'' = (x_{t_1} \oplus B_1^0) B_2^* \oplus B_2 = B_2(x_{t_1} \to B_1^0)$$

$$B_1^* = [B_1(x_{t_2} = 0) \oplus B_1(x_{t_2} = 1)] \qquad B_2^* = [B_2(x_{t_1} = 0) \oplus B_2(x_{t_1} = 1)]$$
$$B_1^0 = B_1(x_{t_2} = 0) \qquad\qquad\qquad\qquad B_2^0 = B_2(x_{t_1} = 0)$$

BOOLEAN FUNCTION CONTROL GATES FOR SECURELY EXECUTING ON A PUBLIC COMPUTER CODE THAT OPERATES ON ENCRYPTED DATA

CROSS-REFERENCE TO RELATED APPLICATIONS

This application is a 371 National Stage Application of PCT Application No. PCT/US2021/070938, filed Jul. 23, 2021, and claims benefit under 35 U.S.C. § 119(e) of Provisional Application No. 63/055,703, filed Jul. 23, 2020, the entire contents of which are hereby incorporated by reference as if fully set forth herein.

BACKGROUND

It is often convenient to keep data confidential from the public by encrypting the data and storing the encrypted data using powerful public resources such as cloud data storage and cloud computing. However, when the amount of data so stored is very large, e.g. on the order of Terabits (Tb, 1 Tb=$10^{12}$ bits), some efficiency is lost if a large fraction of the encrypted data has to be returned to a local secure processor for processing. Similarly, if the operation involves tremendous computational resources, even on relatively little data, it would be advantageous to run on powerful public resources, such as cloud processors, rather than on a secure computer of relatively limited computing power. Yet, to decrypt the data, a processor on the powerful public resources exposes the encryption method and reveals the underlying data.

SUMMARY

Techniques are provided for secure processing of encrypted data on unsecured but potentially powerful public resources. These techniques take advantage of properties of Boolean function control gates to simplify the results of obfuscation compared to the results obtained in previous approaches.

In a first set of embodiments, a method executing on a first (e.g., local and secure) processor includes receiving first data indicating a sequence of reversible Boolean function control gates including a first segment for decrypting permutation encrypted data to produce decrypted data, a second segment for operating on the decrypted data to produce one or more resulting decrypted data, and a third segment for encrypting the resulting decrypted data using permutation encryption to produce permutation encrypted resulting data. A Boolean function control gate affects no more than one bit that is called a target bit. The method also includes storing on a computer-readable medium second data that indicates generic rules for replacing a first sequence of two or more Boolean function control gates operating on at least one shared bit of an input N-bit word with a different second sequence of one or more Boolean function control gates that produce the same output N-bit word. Still further the method includes using the second data to propagate at least one Boolean function control gate from the first segment to a number J of gates distance into the Boolean function control gates for the second segment or beyond and at least one Boolean function control gate from the third segment to a number K of gates distance into the Boolean function control gates for the second segment or before, to produce an obfuscated sequence of reversible Boolean function control gates. The method yet further includes sending obfuscated instructions based on the obfuscated sequence of reversible Boolean function control gates to a second processor (e.g., an unsecured or cloud processor or a processor partition with different access) for execution.

In some embodiments of the first set, the generic Boolean control gate rules take advantage of simplifications available because a Boolean function control gate has only a single target bit.

In some embodiments of the first set, the method also includes storing on a computer-readable medium third data relating each code instruction in a form executable by the second processor to one or more reversible Boolean function control gates operating on an N-bit word. In these embodiments the method also includes using the third data to convert the obfuscated sequence of reversible Boolean function control gates to obfuscated code instructions in a form executable by the second processor. Then, sending obfuscated instructions includes sending obfuscated code instructions in a form executable by the second processor.

In some embodiments of the first set, the method also includes storing on a computer-readable medium third data relating each code instruction in a form executable by the second processor to one or more reversible Boolean function control gates operating on an N-bit word. In these embodiments, receiving first data includes: receiving code instructions in a form executable by the second processor for operating on the encrypted data to produce one or more resulting decrypted data; and, using the third data to convert the code instructions in a form executable by the second processor for operating on the encrypted data to produce one or more resulting decrypted data to the sequence of reversible Boolean function control gates for operating on the encrypted data to produce one or more resulting decrypted data.

In some embodiments of the first set, the method also includes storing on a computer-readable medium fusion data that indicates rules for replacing each of one or more sequences of reversible Boolean function control gates operating on an input N-bit word to produce an output N-bit word, with one or more k-bit gates (wherein 1≤k≤N) that produce a same output N-bit word. In these embodiments, the method further includes using the fusion data to replace a particular sequence of one or more reversible Boolean function control gates of the obfuscated sequence of reversible Boolean function control gates with a k-bit gate that can replace the particular sequence.

In some of these embodiments, the method also includes storing on a computer-readable medium third data relating each code instruction in a form executable by the second processor to one or more reversible Boolean function control gates operating on an N-bit word. In these embodiments, the method further includes storing, on a computer-readable medium, fusion code data that relates each of the one or more k-bit gates with one or more code instructions for the second processor. In these embodiments, the method still further includes: using the fusion code data to convert the k-bit gate to at least part of obfuscated code instructions; and using the third data to convert any remaining reversible Boolean function control gates of the obfuscated sequence of reversible Boolean function control gates to any remaining part of the obfuscated code instructions. In these embodiments, sending obfuscated instructions further comprises sending obfuscated code instructions in a form executable by the second processor.

In some embodiments of the first set, each of J and K is greater than N.

In some embodiments of the first set, the second processor is different from the first processor. In some embodiments of the first set, access to the second processor is different from access to the first processor.

In other sets of embodiments, a computer readable medium or a system is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2A is a block diagram that illustrates an example 3-bit gate operating on an N-bit word, according to an embodiment;

FIG. 2B is a block diagram that illustrates an example pair of 3-bit gates operating on an N-bit word, according to an embodiment;

FIG. 2C is a block diagram that illustrates an example series of 3-bit gates that produce a result equivalent to the result produced by the 3-bit gates in FIG. 2B, according to an embodiment;

FIG. 5A through FIG. 5C show three possible cases for a collision between two gates, when the target line of one gate overlaps with the target or control lines of another gate, according to an embodiment;

DETAILED DESCRIPTION

Figure 1:
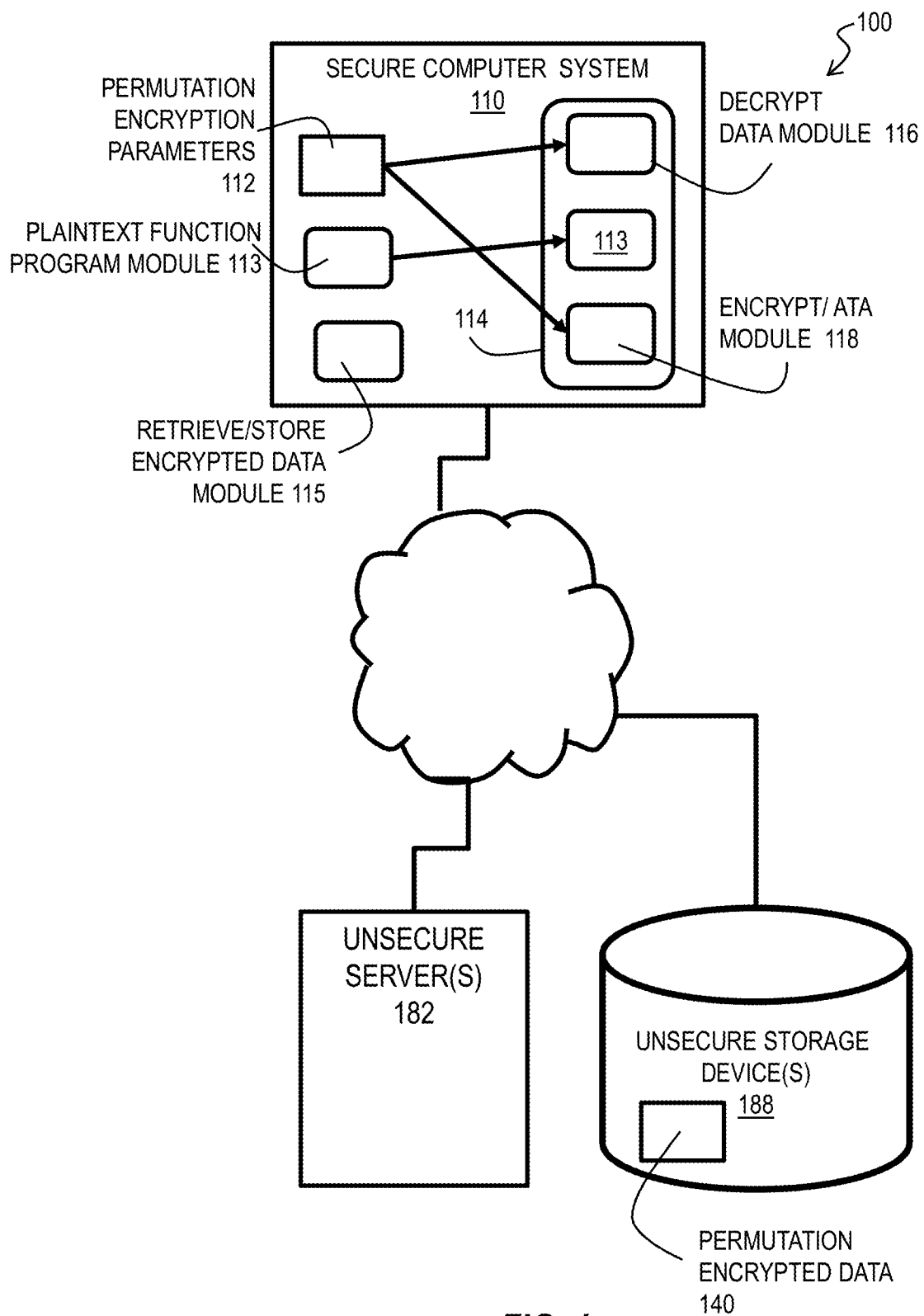
FIG. 1 is a block diagram that illustrates an example system for using encrypted data that is stored on a public resource.

A method and system are described for securely processing encrypted data on public resources, e.g., to take advantage of superior processing power, efficiency or resilience, or some combination, on the public resources, such as the cloud. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of certain example functions and example Boolean function control gates and example options for replacing a pair of Boolean function control gates. However, the invention is not limited to this context. Of the bits spanned by a gate, a Boolean function control gate is a gate that affects no more than one bit, called a target bit, which is either unchanged or negated depending on the binary result of the Boolean expression calculated with the values of non-target bits. In other embodiments, other functions and Boolean function control gates and replacement strategies are employed that follow the methods described herein.

Some embodiments are described in the context of cloud processing of encrypted data. By keeping data encrypted at all times even while being processed, data owners can consider trusting third parties with their most confidential data, in encrypted format, to process and extract value without ever decrypting it. Since the owners keep control over how the data gets used and how the results get decrypted, data can now be treated as a service and no longer has to be treated as an asset. As an asset and unprotected, there is a clear trade-off between utilizing confidential data and keeping it private: one typically can have either one or the other. But as a service and encrypted, a service provider can achieve both: a customer can extract value from confidential data, while encrypted, with privacy and security—for instance to train machine learning models using encrypted data or to combine proprietary encrypted data with other public datasets to make decisions and execute on a marketing campaign.

Thus advantages of various embodiments include: (i) allowing data to stay encrypted at all times (in storage, in transit, and in use), helping to protect confidential data and build trust to migrate it to the cloud; and (ii) unlocking opportunities to share or monetize confidential data as a service with full privacy, powered by encryption and never compromising the unencrypted data, through a new Encrypted Data as a Service (EDaaS) model.

For example, in the case of health care, it is valuable to combine and research different sets of confidential data from health care providers, research institutions and pharmaceutical companies to investigate patterns and find treatment or cures for diseases, without compromising the privacy and security of patients' data. Similar use cases can be found in a wide range of industries and companies that already rely on data for new discoveries and business decisions, or could do so more effectively if they could have access to certain confidential data that is not publicly or commercially available. These industries range from financial and insurance services to health care and manufacturing to the military and government intelligence.

1. Overview

FIG. 1 is a block diagram that illustrates an example system for using encrypted data that is stored on a public resource. Encrypted data 140 is stored on one or more unsecure storage devices 188. In the illustrated embodiments, the encrypted data 140 is encrypted using permutation encryption. In permutation encryption, a plaintext N-bit word is changed to an ciphertext N-bit word by changing the positions and values of the bits from the plaintext to the positions and values in ciphertext in a prescribed manner called the permutation key. The ciphertext is the permutation encrypted data 140. Each N-bit plaintext word is directed to an N-bit ciphertext word. No two different N-bit plaintext words end up as the same N-bit ciphertext word. By knowing the permutation key, the ciphertext can be converted back to the plaintext and used in computations. The number of possible permutations is $2^N!$, so, the larger the number of bits N in each N-bit ciphertext, the more secure is the encrypted data 140.

One or more unsecure servers 182 may have access to the unsecure storage device 188, either directly or through unsecure communications network 180. Without access to the permutation key, these servers 182 and devices in network 180 do not have access to the plaintext. A secure computing system 110 may also have access to the unsecure storage device 188, e.g., through any method known in the art, such as a firewall (not shown). The secure computer system 110 is subject to physical and communication control of an authorized user of the plaintext corresponding to the ciphertext in encrypted data 140. The permutation key, comprising one or more permutation encryption parameters in data structure 112, is known to the users of secure computer system 110.

While there may be more computational power or efficiency if the encrypted data were to be used in processing on one or more unsecure servers 182, current methods are not known to avoid disclosing the permutation key comprising data 112 to any process operating on the unsecure server 182 or network 180. Thus, a user of encrypted data 140 is generally constrained to retrieve some or all the encrypted data 140 from the unsecure storage device 188 through the network 180 for at least temporary local storage on the secure system 110. This retrieval process is performed by the retrieve/store encrypted data module 115 and takes care of identifying which encrypted data to retrieve. If the retrieval criteria depends on information stored as ciphertext, then much data, e.g., most bits in each of one or more N-bit cyphertext word, is transmitted and stored locally that is not needed for the function to be performed.

The function to be performed on the plaintext is represented by the plaintext function program module 113. A different module 114 performs the processes of decrypting the ciphertext (using module 116), operating on the plaintext (using module 113), and encrypting the result using module 118. Both module 116 and module 118 depend on the encryption parameters 112. The module 115 then stores the encrypted result back on the unsecure storage device 188. If the storage location depends on information stored as ciphertext, then much data that is not changed by the plaintext function of module 113 is transmitted over the network 180 and stored on the unsecure device 188. For example, if you want to retrieve persons who have social security numbers (SSNs) beginning with "123", then you have to decrypt the SSN before you can determine if you want to operate on the data. Since you can't do that on the non-secure device, you have to bring all the data to the local device, decrypt at least the SSN of all, and then operate on the desired data, a small subset of the data you downloaded.

2. Boolean Function Control Gates

It is here observed that: 1) permutation encryption can be implemented by a sequence of one or more Boolean function control gates; 2) functions that map inputs one-to-one to outputs can also be implemented by a sequence of one or more Boolean function control gates (for purposes of illustration, it is assumed that function program module 113 implements such a bijective function); and, 4) because there is more than one set of Boolean function control gates that produce the same output for the same input, the decryption, plaintext function and encryption Boolean function control gates can be replaced by a different sequence of Boolean function control gates that do not correspond directly to the decryption, plaintext function and encryption operations. Thus, those operations are obfuscated. Obfuscated code to implement the different sequence of gates can be generated that does not reveal those operations. Thus, the obfuscated code can be sent for operation on the unsecure servers 182. Such code can take advantage of any computing power or efficiencies or resilience of the unsecure servers 182 and unsecure devices 188 without divulging the permutation key. A series of gates is also called a circuit herein. Thus, a program that performs an intended function on the data is converted into a description in terms of gates, as in the circuit model of computation. The logic gates are then expressed in terms of reversible Boolean function control gates, such as a 4-bit control gate known as a Tofolli gate.

FIG. 2A is a block diagram that illustrates an example control gate 201 operating on an N-bit word, according to an embodiment. Three bit locations from an input N-bit word 202a, represented by bit X 203x, bit Y 203y and bit Z 203z, separated or preceded or followed by zero or more bit locations represented by ellipses, are passed into the reversible control gate 201. The results are passed to the output N-bit word 202b in the same three-bit locations. But the contents at those 3 locations may have been changed. In a control gate, only one of the three bits (the target bit) may be changed and the other two are unchanged, so if Z is the target bit, only two results are possible: C unchanged ABC; and C changed ABC'. In section "Simplified rules for Boolean function control gates", Boolean function control gates are represented by a balloon for the non-target bits, also called the control bits, e.g. bits X and Y.

FIG. 2B is a block diagram that illustrates an example pair of 3-bit gates (204a, 204b) operating on an N-bit word, according to an embodiment. The figure depicts input N-bit word 202c, 3-bit gate 204a, 3-bit gate 204b and output N-bit word 202d. Twelve contiguous bit locations are indicated by horizontal line segments, preceded and followed by zero or more other bit locations indicated by ellipses. If it is desired to move 3-bit gate 204a past 3-bit gate 204b, e.g., in order to obfuscate 3-bit gates associated with decryption from 3-bit gates associated with the plaintext function, then the gates are said to move. If the two gates 204a and 204b, share at least one bit, then movement causes the gates to produce a set of one or more different gates, called "debris" gates, none recognizable as the original gates 204a and 204b. In this case the gates are said to "collide." Rules for determining how to resolve such "collisions" are described in a later section, below. This broad concept is represented by FIG. 2C.

FIG. 2C is a block diagram that illustrates an example series of 3-bit gates that produce a result equivalent to the result produced by the two 3-bit gates 204a and 204b in FIG. 2B, according to an embodiment. This is not an actual solution that applies to particular 3-bit gates 204a and 204b, but just indicates that gates 204a and 204b are consumed in the solution, and replaced by four different "debris" 3-bit gates 202c, 204d, 204e and 204f.

As used herein, gate Ga is said to have moved past gate Gb. For example, in forward movement, when a gate Ga on the left is to be moved past a gate Gb on the right, a collision must occur whenever gates Ga and Gb act on one or two common bit lines. In the case when gates Ga and Gb do not share bit lines, motion of gate Ga past gate Gb is achieved by swapping their order. In the case when they share the target bit line, they first merge into a single gate, and this gate continues the motion intended for gate Ga. In a collision, the original gates Ga and Gb are replaced by an equivalent sequence of debris gates, with the number of debris gates depending on the number of bit lines shared. We call the "descendant" of gate Ga the right most gate resulting from the motion of gate Ga past gate Gb, including the right most debris gate resulting from a collision. If the original intent was to move gate Ga past other gates to the right of gate Gb, the descendant of gate Ga or some other debris gate from the collision has to move past the gate immediately to the right of the original gate Gb, say Gc. If further motion to the right is intended, the process is repeated until gate Ga or at least one of its descendant moves past a pre-established number of gates on their right. When a gate Gb on the right is to be moved past a gate Ga to the left or beyond, in backward movement, one follows the same procedure as described above, but with the direction of motion inverted.

In various embodiments, the concept of moving gates is used in an amalgamation process to obfuscate code by moving gates associated with decryption or encryption past gates associated with the plaintext function.

In previous work, collisions results were specified only for gates of a certain size (e.g., 3 bits) or control gates involving only a single product of Boolean variables, the latter called herein single product control (SPC) gates. The collision results could lead to rapid expansion in the number of SPC gates in the obfuscated code. In the work presented here, control gates are expanded to include any Boolean function involving any number of head bits (also called balloon bits hereinafter) and the results are more concise.

A generic Boolean function control (BFC) gate acting on bit j has the effect described in Equation 1, where B indicates any Boolean function.

$$xj \to xj \oplus B(x_{i1}, x_{i2}, \ldots, x_{in}), j \neq i1, \ldots, in \qquad (1)$$

The symbol $\oplus$ indicates the exclusive OR (XOR) operation. The expression $x_1 \oplus x_2$ is true when either $x_1$ or $x_2$, but not both, are true. In contrast, an example of a SPC gate is as described in Equation 2.

$$xj \to xj \oplus [x_{i1} \cdot x_{i2} \cdot \ldots \cdot x_{in}], j \neq i1, \ldots, in \qquad (2)$$

where any of the factors could be negated (not shown) as indicated by a negative sign. An example of a generic 4-bit Boolean function that is not a single product is given in Equation 4.

$$B(x_{i1}, x_{i2}, x_{i3}, x_{i4}) = (x_{i1} \oplus -x_{i2} \cdot x_{i3}) \cdot (-x_{i2} \oplus x_{i3} \cdot x_{i4}) \qquad (3)$$

Expanding Equation 4 yields 4 product terms; so, one would need 4 SPC gates to achieve the same result as the one BFC gate represented by Equation 4.

Similarly, an example n-bit Boolean function is given by Equation 4.

$$B(x_{i1}, x_{i2}, \ldots, x_{in}) = (x_{i1} \oplus x_{i2} \cdot x_{i3}) \cdot (x_{i2} \oplus x_{i3} \cdot x_{i4}) \cdot \ldots \cdot (x_{i(n-2)} \oplus x_{i(n-1)} \cdot x_{in}) \qquad (4)$$

Equation 4 is expressed as a product of one-bit sums modulo 2 (XORs). To evaluate Equation 4, one just has to carry out on the order of n, O(n), sums and multiplications modulo 2; so, the evaluation of this control balloon can be done easily. However, if one were to expand this expression as a sum of products instead, one would have $O(2^n)$ terms. Thus, an exponential number of SPC gates are needed to replace one BFC gate. Keeping one BFC gate instead of many SPC gates provides a concise set of gates. This conciseness is an advantage provided by the current approach over previous approaches for gates and gate collision rules and results.

In the cases where one is presented with two possible sets of instructions that evaluate to the same Boolean, one can choose at random which of those possibilities to follow. Choosing one at random is just another way to state that the multiple choice is a mechanism to erase information. It is a way to actually implement and explore the branch of possibilities, as opposed to expressing the instructions in some standard way that leaves plain which branch of possibilities is taken. One other source of randomness concerns the order in which the gates, after conjugation, are written. Notice that before conjugation, all the arrangements of gates are symmetric, and therefore the associated computations are their own inverses. Naturally, after conjugation, the results are their own inverses as well. Therefore, whenever there is more than one gate after conjugation, there are two choices when writing the result: a first set of gates from the rule and those same gates written in reverse order. Chosen at random, after multiple conjugations, one obtains different possible equivalent circuits where the target bits are acted on in different orders.

In some embodiments, groups of gates are fused together, replaced by a smaller set of gates. One fusion scheme consists of substitution of certain intermediate variables by look up tables (LUTs); and the construction is done recursively. Step 1. Consider all variables $v_i$ in the set of instructions B. One separates the variables into primary and descendent. The primary variables are initially set to be all the input variables. The descendent are all the others. Step 2. Determine the dependence size for all descendent variables, defined as the number of primary variables that the descendent variable depends on. Pick one variable (call it v) whose size d(v) is closest to some value s. Then substitute the original instruction in terms of other variables by a LUT in terms of the primary variables, and change the classification of that variable to primary. Step 3. Repeat the procedure above, keeping in mind that the dependence size for all descendent variables will now change as a result of passing v to the primary list. The repetition is done until no more variable is in the descendent list, or until the main variable B enters the primary list. Step 4. The fused program is the set of LUTs and remaining instructions that compute B.

3. System

Figure 3:
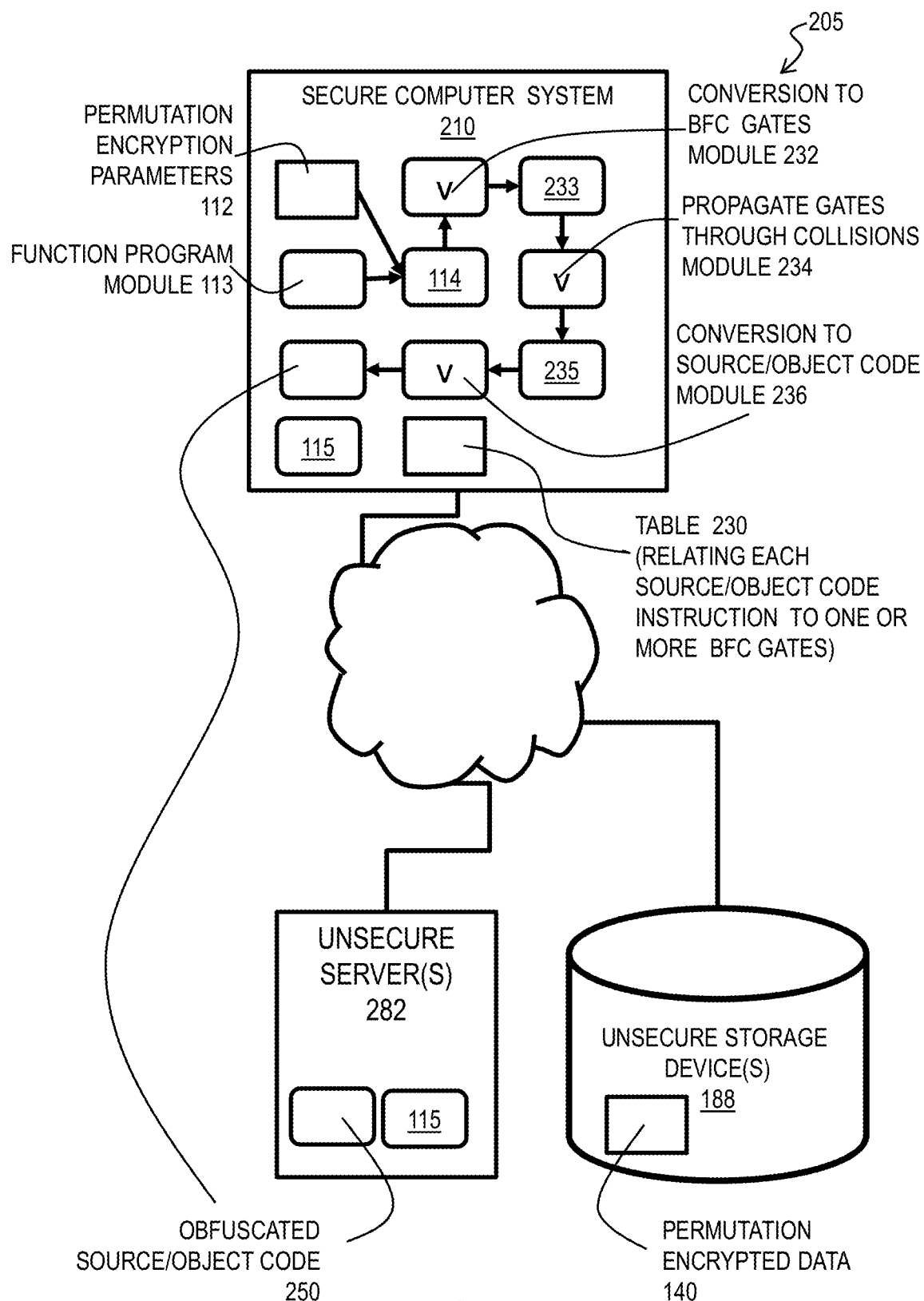
FIG. 3 is a block diagram that illustrates an example system for securely processing on a public resource encrypted data stored on a public resource, according to an embodiment.

FIG. 3 is a block diagram that illustrates an example system for securely processing on a public resource encrypted data stored on a public resource, according to an embodiment. The network 180, unsecure storage devices 188; permutation encrypted data 140, permutation encryption parameters data 112, plaintext function program module 113, module 114, and retrieve/restore encrypted data module 115 are as described above for FIG. 1.

The secure computer system 210 is different from system 110 because system 210 now contains table 230, module 232, module 233, module 234, module 235, module 236 and module 250. Table 230 associates each source code or object code instruction in a form to be executed by the unsecure servers 282 with a sequence of one or more Boolean function control gates that produce the same output one or more N-bit words from the same input one or more N-bit words as the source or object code instruction.

A program P comprising a decryption module $E^{-1}$, a function module $f$, and an encryption module $E^1$ acts on a word made up of a number n of bits. All data encrypted in the database is encrypted using a scheme based on permutations constructed using reversible Boolean function control gates, such as the 3-bit Toffoli gate. Reversible computing ensures that the result from the total circuit is a permutation that takes an n-bit input x (herein, n and N are used interchangeably) and returns an n-bit output y=P(x), where P(x) is a permutation acting on the space of the $2^n$ possible n-bit input x. The permutations on the 2n-dimensional bit space are generated from simple permutations using reversible Boolean function control gates. Because the program E(x) that encrypts the plaintext data x' into cyphertext x is expressed using reversible gates, one can obtain the program $E^{-1}$ that decrypts the data by reversing the computation, using the inverse of each of the gates in the program, read in the reversed order. This reversed operation yields the inverse of the permutation, $x'=E^{-1}(x)$, which decrypts the data. In addition, the program $f$ that performs the intended task on the plaintext data x' is converted into a description in terms of gates, as in the circuit model of computation, or produced by compilers for a central processing unit (CPU) or field programmable gate arrays. The logic gates are then expressed in terms of reversible Boolean function control gates. In some embodiments, the final circuit, e.g., the amalgamated/obfuscated $E^{-1} \cdot f \cdot E$, is programmed into a FPGA. This implementation has an advantage in that the action of the circuit on the input data runs faster, since it is implemented in hardware. In other embodiments E and $E^{-1}$ are defined using other encryption schemes, such as Advanced Encryption Standard (AES), as long as these schemes are formulated in terms of reversible gates.

A reversible program P is then constructed by piping together three stages of programs: a module $E^{-1}$ to decrypt the data, a module $f$ to perform the intended task, and a module $E^1$ to encrypt back the data. Because each of the modules have been expressed in terms of reversible Boolean function control gates, the combined program P as a whole is composed of reversible Boolean function control gates. The combined reversible program is a permutation that takes an n-bit ciphertext word x as input and outputs a ciphertext word y=P(x), where P(x) is a permutation acting on the space of the $2^n$ possible n-bit input x.

In some embodiments, it is preferable to associate each object code instruction with one or more Boolean function control gates, because object code tends to comprise a reduced number of commands so a total number of entries in the table can be smaller than for a table relating to higher level compound source code instructions. Also, the object code tends to operate on the level of the processing chip registers so the N-bits can be matched easily to the number of bits in the registers, simplifying the mapping. Source code can be written in any language and then compiled using the appropriate existing compiler for the unsecured servers to produce the object code that is mapped to the sequences of Boolean function control gates.

The description of the full program (or permutation) P in terms of Boolean function control gates is not unique. There are other sequences of Boolean function control gates that yield the same final result P(x) for an input x, but the intermediate states of the machine are all different. Thus, an obfuscated program $P^{(o)}$ can be run on a shared, public computer without giving away the key to decrypting the ciphertext stored on the public storage. In order to find a new sequence of gates yielding $P^{(o)}$, the three segments $E^{-1}$, $f$, and $E^1$ are advantageously amalgamated such that one can no longer distinguish them. The amalgamation includes moving gates from one segment across the boundary with another segment. But simply moving the gates is not enough; the gates pass each other, as to penetrate deep into the bulk of another segment.

It is the program $P^{(o)}$ that is sent to the server for execution. The cloud service provider is able to perform the computation requested, reading data from the encrypted database, and outputting encrypted data. But the cloud provider is not able to discern what is being done throughout the computation, for although the final output is the same, the intermediate steps yield different results at most or all steps of the calculation. For example, a client wants to search the database for all entries that satisfy a query that is a Boolean expression. The server runs the obfuscated code, reading from the encrypted database and writing the successful queries into the encrypted output file, which is sent back to the client. The client then decrypts the answer on the secure computer.

In some embodiments, described in more detail below, several Boolean function control gates are fused into one k-bit gate (3<k≤N). In such embodiments, table 230 includes entries or instructions that associate each source code or object code instruction with one or more k-bit gates that produce the same output one or more N-bit words from the same input one or more N-bit words as the source or object code instruction. In some of these embodiments, table 230 also includes entries that relate each k-bit gate with a sequence of one or more Boolean function control gates. Thus, if that sequence of Boolean function control gates is ever observed, the corresponding k-bit gate can be substituted, as desired. For example, table 230 includes rules or instructions to convert a series of Boolean function control gates into a k-bit gate, which is a straightforward process for a person of ordinary skill in the art without undue experimentation. In some embodiments, q-bit gates are successively combined until a k-bit gate is produced.

Module 232 is configured to convert source code or object code to sequences of Boolean function control gates. Module 232 uses at least some of the data in table 230 and labels each Boolean function control gate as belonging to decryption or the plaintext function or encryption. In some embodiments, as described in more detail below, the module 232 breaks plaintext function into a series of segments, and an encryption process is added after each segment and a corresponding decryption process added before the next segment. This segmentation of the plaintext function can be done either before or after the conversion of source/object code to sequences of Boolean function control gates. In some of these segmented plaintext function embodiments, each q-bit gate is labeled as associated with the plaintext function or with an encryption/decryption process. In some embodiments, encryption Boolean function control gates are labeled to distinguish them from decryption Boolean function control gates. The output of module 232 is module 233 comprising a sequence of Boolean function control gates equivalent to module 114. In some embodiments, the decryption process or encryption process or both are defined in terms of Boolean function control gates (e.g., the permutation encryption parameters 112 includes a series of Boolean function control gates that perform decryption or a series of q-bit gates that perform encryption or both). In these embodiments module 232 need not convert any source or object decryption code or encryption code or both to Boolean function control gates. In some embodiments, encryption is accomplished simply by reversing the order of the control gates that perform decryption and parameters 112 only includes one series, for either decryption or encryption.

Module 234 is configured to move Boolean function control gates from one or more encryption or decryption processes to positions among the Boolean function control gates of a plaintext function segment or beyond. This is called an amalgamation process herein. In some embodiments, the amalgamation process consists of three steps. In the first step, gates involved in the decryption segment are propagated forward past gates involved in the plaintext function segment, resulting in a first-stage amalgamated segment. In the second step, gates involved in the encryption segment are propagated backward past gates resulting from the first step, resulting in a second-step amalgamated sequence of gates. In the third step, a number of Boolean function control gates of this sequence are fused into k-bit gates (k>3). Gate propagation consists of the motion of a gate past gates located on its right or left side, depending on whether the propagation is forward or backward, respectively.

Step one begins by propagating the right-most gate (e.g., Gz) in the decryption segment in the forward direction past J gates into the plaintext function segment or beyond. J is called the propagation distance. Recall, as defined above, motion past J gates means the Gz descendent (either the "moving" gate Gz or its farthest collision debris gate) has moved past the original J gates to the right of Gz. The process continues by propagating the second right-most gate in the decryption segment (e.g., Gy) past J' gates in the plaintext function segment or beyond. In this propagation, the second right-most gate (Gy) also moves past debris gates, if any, left over from the propagation of the first right-most gate (Gz). Each of the leftover gates counts as 1 toward the target J' that can be less than, equal to, or greater than J. An advantage of being equal or less than J is to accomplish obfuscation efficiently with fewer computations. An advantage of being greater than J is more complete obfuscation. In some embodiments J' is selected randomly to be vary about the value of J, to make it even more difficult to reverse the obfuscation process. The process is repeated until all gates in the decryption segment are propagated at least partway into the plaintext function segment or beyond, resulting in the amalgamation of the decryption segment with the plaintext function segment.

In step two, the encryption segment is amalgamated with the sequence of gates resulting from the previous amalgamation of the decryption and plaintext function segments. The process is analogous to the one described for step one, but in the backward direction. It starts with the left-most gate (e.g., Ga) involved in the encryption segment moving backward past K gates in the decryption-plaintext function amalgamated segment. Recall, as defined above, motion past K gates means either the Ga descendent (either the "moving" gate Ga or its farthest collision debris gate) has moved past the original K gates to the left of Ga. It continues with the motion of the second left-most gate (e.g., Gb) in the encryption segment past K' gates to the left, which includes also moving past gates left over from the propagation of the first left-most gate (Ga). Each of the leftover gates counts as 1 toward the target K' that can be less than, equal to, or greater than K. As above for J' and J, an advantage of being equal or less than K is to accomplish obfuscation efficiently with fewer computations. An advantage of being greater than K is more complete obfuscation. In some embodiments K' is selected randomly to be vary about the value of K, to make it even more difficult to reverse the obfuscation process. Step two ends when all gates in the encryption segment are propagated at least partway into the amalgamated decryption/function gates to the left.

In some embodiments, the method is modified to alternate between bringing the left-most gate of the right-hand side into the left-hand side (R→L) with bringing the right-most gate of the left-hand side into the right-hand side (L→R). Optional step three to combine several Boolean function control gates into a k-bit gate is described in more detail below.

Automated propagation and collision procedures that take advantage of simplifications available by using only Boolean function control gates are described in a separate section, below.

Module 236 is configured to convert obfuscated sequences of Boolean function control gates to obfuscated source code or object code. Module 236 uses at least some of the data in table 230. In some embodiments, as described in more detail below, the module 236 first fuses at least some Boolean function control gates into a k-bit gate based on a straightforward computation or based on the associations stored in table 230. The k-bit gates are converted to source code or object code using associations stored or coded in table 230 between k-bit gates and source code or object code instructions. In some embodiments the translation of a k-bit gate into one or more source or object code instructions is straightforward for a person of ordinary skill in the art without undue experimentation based on rules or one or more instructions. The output of module 236 is module 250 comprising obfuscated source or object code equivalent to module 114. This module 250 can be sent safely to unsecure servers 282 with module 115, as shown, to operate on the encrypted data 140 using the power or efficiency or resilience of those servers 282.

Although processes, equipment, and data structures are depicted in FIG. 1 and FIG. 3 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

4. Method

Figure 4:
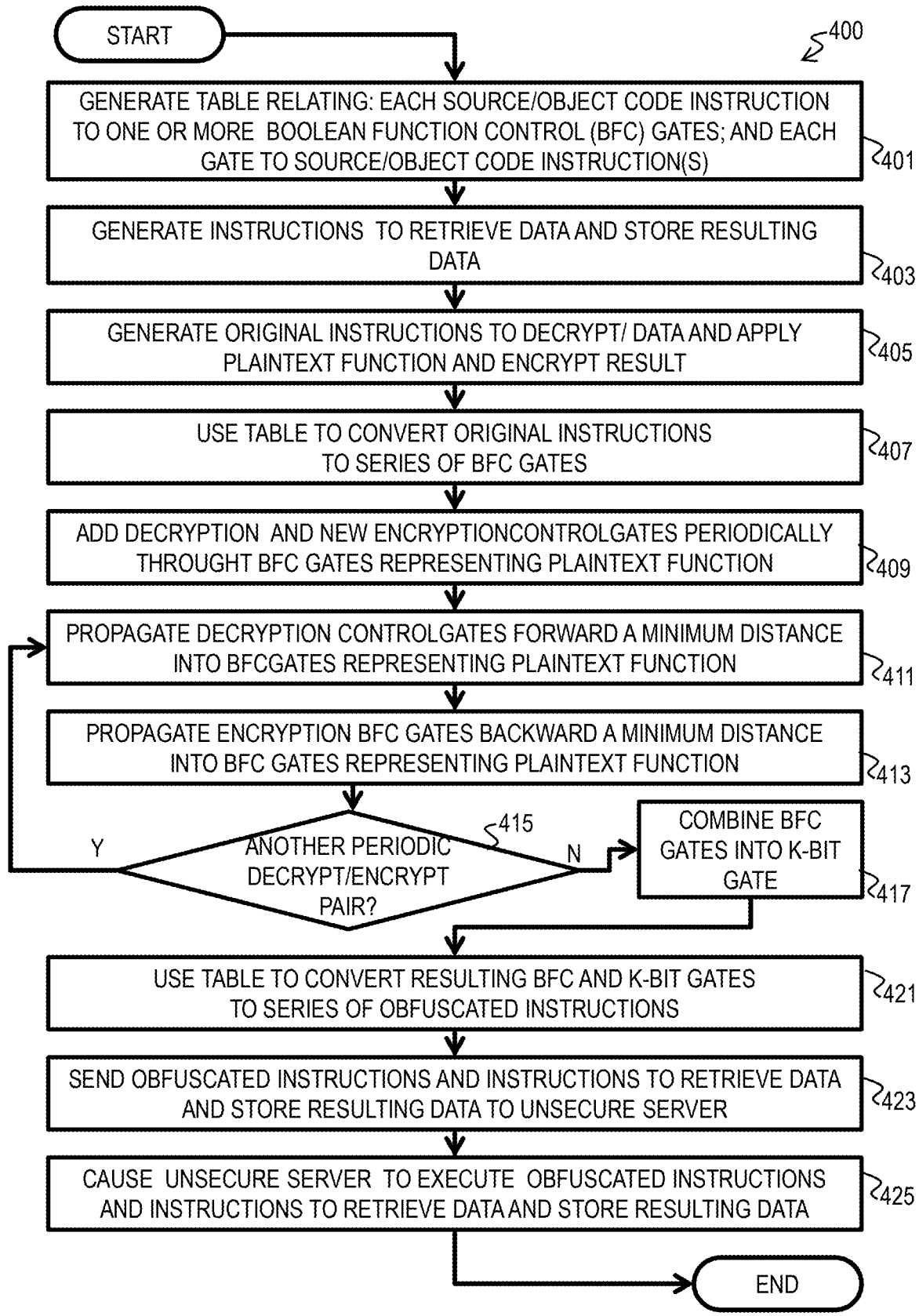
FIG. 4 is a flow chart that illustrates an example method for securely processing on a public resource encrypted data stored on a public resource, according to an embodiment.

FIG. 4 is a flow chart that illustrates an example method 400 for securely processing, on a public resource, encrypted data stored on a public resource, according to an embodiment. Although steps are depicted in FIG. 4 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 401, table 230 is generated. This can be done manually or automatically, but when completed the results are stored as table 230 on a computer-readable medium. The entries in table 230 associate at least each source code or object code instruction with one or more Boolean function control gates. In some embodiments the source code or object code are instructions for a field programmable gate array (FPGA). In some embodiments, different associations are used going forward from source/object code to sequence of Boolean function control gates than used going backward. For example, in the forward direction each object code instruction in a reduced instruction set processor (RISP) is converted to the fewest Boolean function control gates, while going backward each Boolean function control gate is converted to the most efficient RISP instructions, such as SHIFT functions, to execute a single Boolean function control gate.

In some embodiments using fusion, entries are included in table 230 to convert from each of one or more source code or object code instructions to a k-bit gate ($3<k\leq N$). Translating control or k-bit gates into source/object code instructions is straightforward for a person of ordinary skill in the art without undue experimentation. In embodiments not using fusion, these entries involving k-bit gates can be omitted from table 230.

In step 403, instructions are generated for module 115 to retrieve input ciphertext from encrypted data structure 140 and store resulting ciphertext in data structure 140. This can be done manually or automatically, e.g., based on an SQL query.

In step 405, instructions are generated for module 114 to decrypt the ciphertext, apply the plaintext function, and encrypt the resulting plaintext to produce result ciphertext for storage. In some embodiments, step 405 includes breaking the function into several function segments and adding new encryption instructions after each segment and adding corresponding decryption instructions before the next segment. In some embodiments that convert object code back and forth to Boolean function control gates, step 405 includes compiling source code that performs the function (segment), and optionally the leading decryption and following encryption segments, to generate the object code that is then converted to Boolean function control gates in step 407.

In step 407, table 230 is used to convert the instructions produced in step 405 to a sequence of Boolean function control gates. In some embodiments, a table is not used, and instead a gate compiler, that can be produced by a skilled programmer, is operated to convert source/object code to Boolean function control gates. In some embodiments, a combination of a compiler and a table 230 is used. In some embodiments a complier for a FPGA is used or the gates are implemented on a FPGA, or both. In some embodiments, step 407 is performed by module 232. The output of step 407 is module 233 of Boolean function control gates.

In step 409, the control gates corresponding to the plaintext function is broken up into several segments and encryption and decryption gates are added between segments. In some embodiments, step 409 includes determining a number of gates to include in each segment, and is related to the depth of propagation determined for step 411, as described below. The depth of penetration (e.g., J, J', K or K', or some combination) is determined as a tradeoff because the greater the depth the more collisions and the more collision the more gates are generated. Increased depth is desirable for increased obfuscation, but too many resulting gates makes the resulting code excessively long and inefficient. To determine the number of segments, it is advantageous to achieve a good enough obfuscation of the function without incurring an excessive number of gates resulting from the collisions. A single segment would achieve maximum obfuscation, but would result in an exponentially large series of gates if all gates from the decryption and encryption segments were moved across the function segment. Breaking the function into too many segments (say, one for each gate in the function segment) would result in a weak obfuscation. A good balance is when the number of segments is of the order of (represented by the symbol $\mathcal{O}(\ )$) the number of bits in the N-bit word. But the optimal number of segments will depend on the type of function. For example, it is common for functions to have many gates, say $\mathcal{O}(N^2)$, e.g., multiplication does; but it is not always true. Some functions may have fewer gates, say $\mathcal{O}(N)$, like addition, in which case one need not break $F(x)$ into segments to accomplish pretty good amalgamation without exponential growth. In fact, this is the reason why it is proposed to break $F(x)$ into segments, each segment with $\mathcal{O}(N)$ gates. Then, the amalgamation can be performed locally without incurring exponential growth of the circuit length. For an $F(x)$ function with $\mathcal{O}(N^2)$ gates, one would use about $\mathcal{O}(N)$ segments. To further confound reversing the obfuscation, it is advantageous to add a random element to either or both the segment length and to the depths of penetration.

If this segmenting of the plaintext function had been done at the source/object code level in step 405, then step 409 is omitted. For example, steps 407 and 409 are performed by module 232 in FIG. 3. In some embodiments, encryption/decryption segments already written as sequences of Boolean function control gates are employed (instead of using encryption/decryption segments written in source/object code level).

In step 411, Boolean function control gates involved in decryption are propagated forward past Boolean function control gates involved in the plaintext function or current segment thereof. A distance to move into the plaintext function is based on a tradeoff between the penetration obtained and the increase in the number of gates resulting from the collisions. A distance J (e.g., J number of gates) is defined for moving decryption Boolean function control gates forward into the plaintext function (segment) or beyond. Example methods to determine this distance is described in the Examples section. Collisions with existing reversible Boolean function control gates are resolved using the specific procedures described in a separate section, below.

In step 413, Boolean function control gates involved in encryption are propagated backward past Boolean function control gates involved in the plaintext function or current segment thereof. A penetration distance to move into the plaintext function is based on a tradeoff between the depth obtained and increasing the number of gates for each collision. A distance K (e.g., K number of gates) is defined for moving encryption Boolean function control gates backward into the plaintext function (segment) or beyond. Collisions with existing Boolean function control gates are resolved using the specific procedures described below.

In step 415 it is determined if there is another decryption-plaintext function segment-encryption sequence of Boolean function control gates. If so, obfuscated control sequences of module 235 have been produced; and, control passes back to step 411. If not, control passes to step 417. For example, the loop described by steps 411, 413 and 415 is performed by module 234 in FIG. 3.

In step 417, a sequence of Boolean function control gates in the obfuscated Boolean function control gate module 235 is replaced with (combined into) one or more k-bit gates. It is relatively simple to fuse Boolean function control gates into a k-bit gate, with k>3. For example, a program generates the k-bit gate given the sequence of Boolean function control gates. In these embodiments, table 230 relates source/object code instructions to Boolean function control gates (both ways) and k-bit gates to source/object instructions (one way). In some embodiments, fusion is not used; and, step 417 is omitted.

In step 421, the Boolean function control gates, and k-bit gates, of the obfuscated code are converted to source code or object code using table 230 to produce obfuscated source/object code module 250. For example, steps 417 and 421 are performed by module 236 in FIG. 3. In some embodiments, module 236 could be implemented on the unsecure server, provided that the fusion takes place before sending out the sequence of gates in module 235. That would take advantage of the computational power available on the cloud In step 423, the obfuscated code 250 and data retrieval and result storage module 115 are sent to the unsecure servers 182. In step 425, the unsecure server is caused to execute the retrieval/storage module 115 and obfuscated code 250. For example, a command to execute those modules is sent in a message to the unsecure server.

The number of Boolean-controlled gates that are generated in the recursive process depends on which of the conjugation rules are followed in each step of the process. The final number of gates in the equivalent circuit also depends on the number of gates q in the encryption scheme.

5. Simplified Rules for Boolean Function Control Gates

Rules for replacing a first sequence of two Boolean function control gates operating on an input N-bit word with a second sequence of one or more Boolean function control gates that produce the same output N-bit word include commutation rules, collision rules and conjugation rules. Replacement and fusion rules taking advantage of the property that each control bit has only one target bit that is a Boolean function of zero or more non-target (control) bits are described in more detail here. In other embodiments, other rules are used.

Figures 5A, 5B:
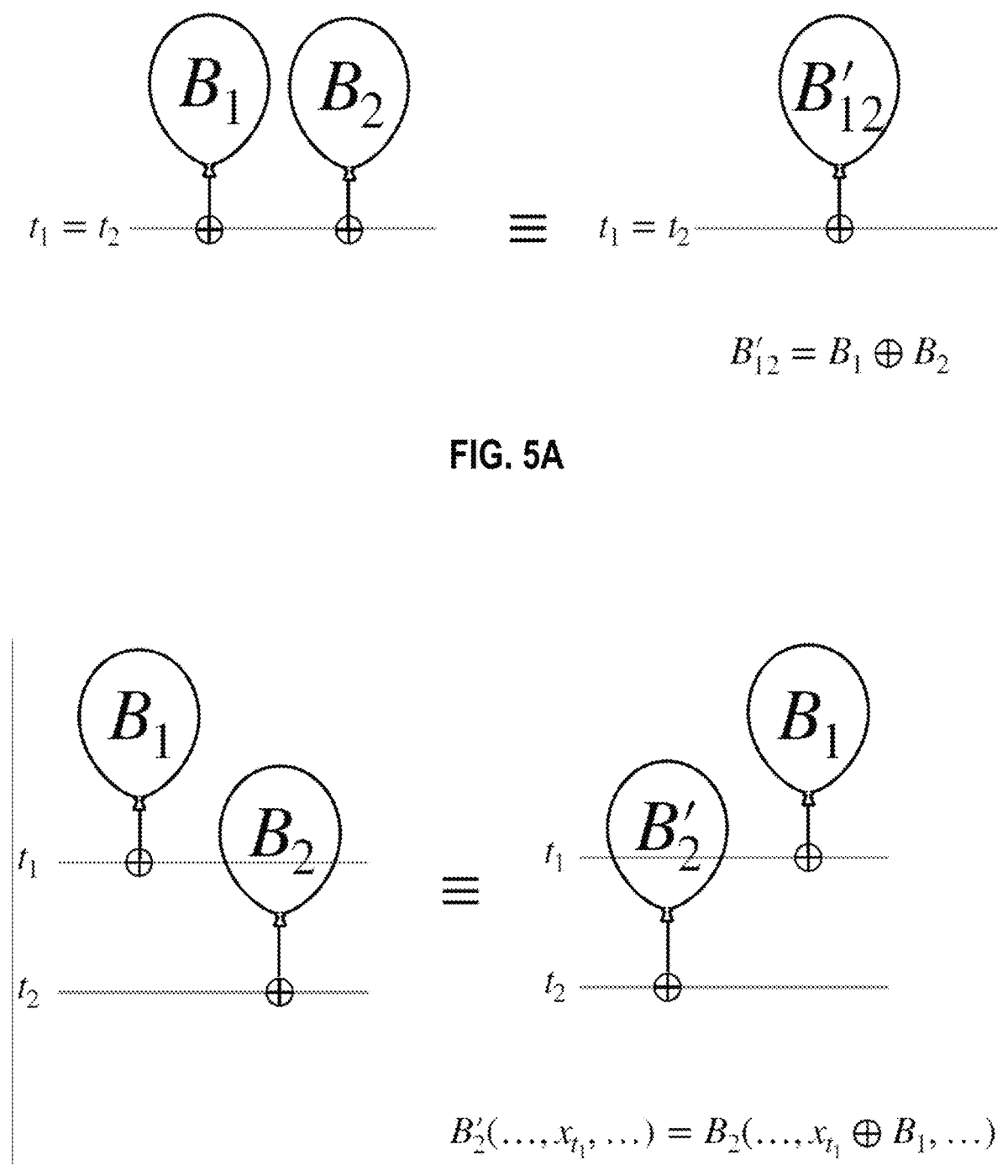
Figure 5C:
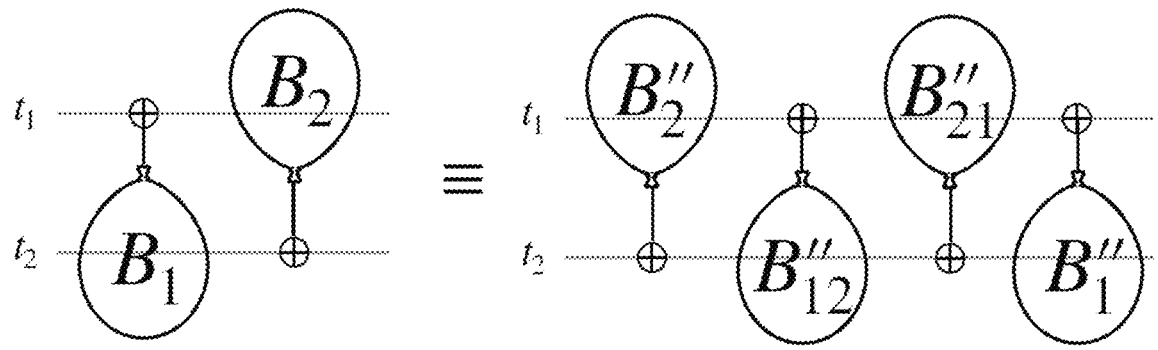

FIG. 5A through FIG. 5C show three possible cases for a collision between two gates, when the target line of one gate overlaps with the target or control lines of another gate, according to an embodiment. Here the target line of gate $g_1$ overlaps with the target or control lines of gate $g_2$; and, the following rules apply.

FIG. 5A shows simplification that occurs when the two gates share the same target bit line. In this case, the two gates $g_1$ and $g_2$ with Boolean expressions $B_1$ and $B_2$, respectively, can be merged into one, combining the two Boolean expressions by adding (XORing) them in one step, setting the net operation $B'_{12}$ given by Equation 5.

$$B_{12}'=B_1 \oplus B_2 \tag{5}$$

FIG. 5B shows one-headed collision that occurs when the target of one gate pierces the other's Boolean formula (each depicted as a balloon in FIG. 5A through FIG. 5F). In this case, the two gates swap places and the Boolean formula $B_2$ of the gate that gets pierced by the target of the other is updated to $B_2'$ in one step by substituting $x_{t_1} \oplus B_1$ at the Boolean variable $x_{t_1}$ on the bit line ($t_1$) where the piercing takes place, as given by Equation 6.

$$B_2'(\ldots, x_{t_1}, \ldots) = B_2(\ldots, x_{t_1} \to x_{t_1} \oplus B_1, \ldots) \tag{6}$$

FIG. 5C shows two-headed collision that occurs when the target of each gate pierces the other's Boolean formula. The two gates with Boolean formulae $B_1$ and $B_2$, respectively, in order, are replaced by four gates with Boolean formulae of $B_2''$, $B_{11}''$, $B_{21}''$, $B_1''$, respectively, in order, formed in two steps given by equations 7a through 7d in a preceding step 1, and equations 8a through 8d in a succeeding step 2.

$$B_1^* = [B_1(x_{t_2}=0) \oplus B_1(x_{t_2}=1)] \tag{7a}$$

$$B_1^0 = B_1(x_{t_2}=0) \tag{7b}$$

$$B_2^* = [B_2(x_{t_1}=0) \oplus B_2(x_{t_1}=1)] \tag{7c}$$

$$B_2^0 = B_2(x_{t_1}=0) \tag{7d}$$

$$B_1'' = (x_{t_2} \oplus B_2^0) B_1^* \tag{8a}$$

$$B_2'' = (x_{t_1} \oplus B_1^0) B_2^* \tag{8b}$$

$$B_{12}'' = B_1(\ldots, x_{t_2} \to B_2^* x_{t_2}, \ldots) \tag{8c}$$

$$B_{21}'' = B_2(\ldots, x_{t_1} \to B_1^* x_{t_1}, \ldots) \tag{8d}$$

Figure 5D:
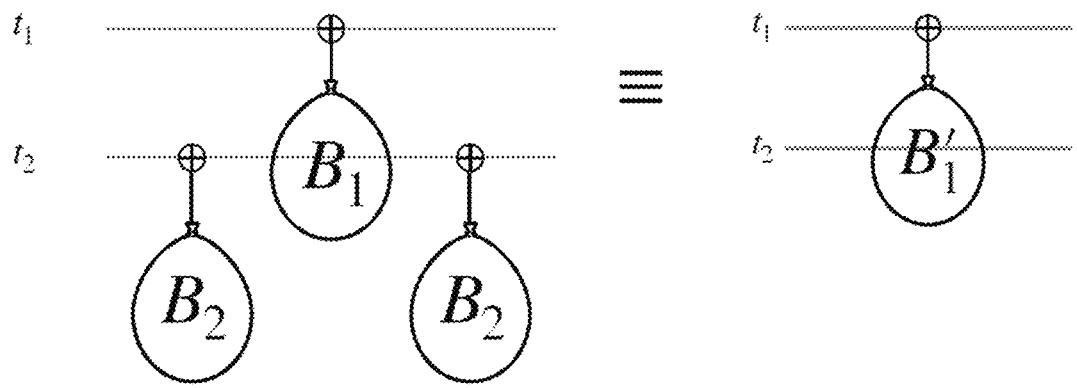
FIG. 5D through FIG. 5F show replacement gates using commutation rules, collision rules and conjugation rules, respectively, according to an embodiment.
Figure 5E:
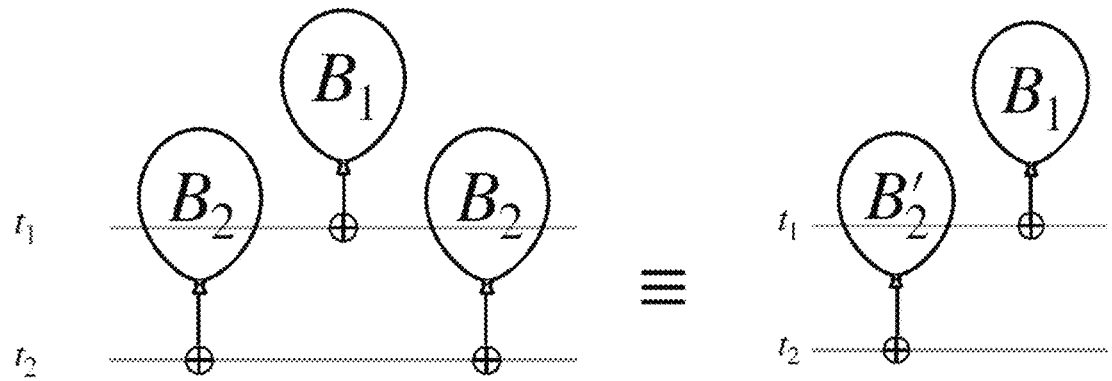
Figure 5F:
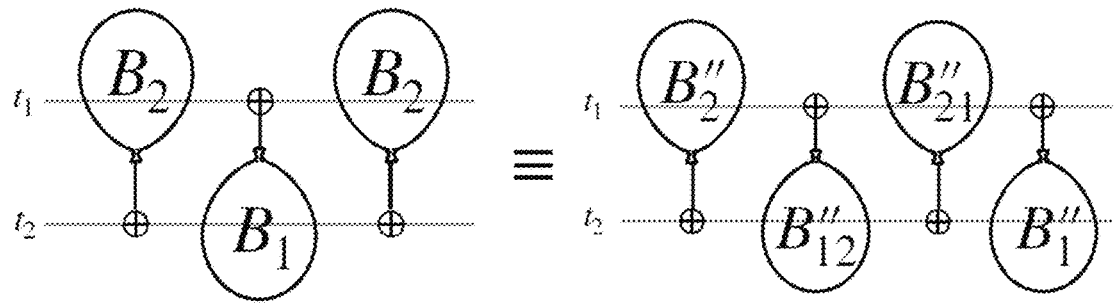

Rules for replacing a first sequence of two Boolean function control gates operating on an input N-bit word with a second sequence of one or more Boolean function control gates that produce the same output N-bit word include commutation rules, collision rules and conjugation rules. FIG. 5D through FIG. 5F show replacement gates using commutation rules, collision rules and conjugation rules, according to an embodiment. One can use the collision rules in FIG. 5A through FIG. 5C to obtain the replacement rules for the case when a gate $g_1$ is sandwiched between another $g_2$ and its inverse $g_2^{-1}$, yielding $g_1' = g_2 g_1 g_2^{-1}$.

If the two gates g1 and g2 commute, then it follows that $g_1' = g_1$.

FIG. 5D shows a case when the $g_2$ target bit collides (one-headed) with the controls of $g_1$ at bit $x_{t_2}$. Note that the Balloon gates are their own inverse. In this case, the Boolean expression $B_2$ that controls $g_2$'s action is inserted into that of $B_1$ to produce the single replacement Boolean expression $B'_1$ as given by Equation 9.

$$B_1'(\ldots, x_{t_2}, \ldots) = B_1(\ldots, x_{t_2} \oplus B_2, \ldots) \tag{9}$$

FIG. 5E shows a case when $g_2$ control bits collide (one-headed) with the target of $g_1$. In this case, the conjugation leaves behind another gate (a "debris" gate $g_2$ with Boolean expression BD that precedes $g_1$. $B_2'$ is formed in two steps given by equation 10a in a preceding step 1, and equation 10b in a succeeding step 2.

$$B_2^* = [B_2(x_{t_1}=0) \oplus B_2(x_{t_1}=1)] \tag{10a}$$

$$B_2' = B_1 B_2^* \tag{10b}$$

The dependence on $x_{t_1}$ is traced out in $B_2^*$, and information is erased in the process; at least one bit of information is thrown away.

FIG. 5F shows a case when the controls of one gate are hit by the target of the other, and vice versa (two-headed collision). In this case, the conjugation leaves behind four gates altogether in the order of $B_2''$, $B_{12}''$, $B_{21}''$, $B_1''$. They are formed in two steps given by equations 7a through 7d, given above, in a preceding step 1, and equations 11a through 11d in a succeeding step 2.

$$B_1''=B_1(\ldots, x_{t_2} \to x_{t_2} \oplus B_2^0, \ldots) \oplus B_1^0 \quad (11a)$$

$$B_{21}''=B_2(\ldots, x_{t_1} \to B_1^* x_{t_1}, \ldots) \quad (11b)$$

$$B_{12}''=B_1(\ldots, x_{t_2} \to B_2^* x_{t_2}, \ldots) \quad (11c)$$

$$B_2''=B_2(\ldots, x_{t_1} \to B_1^0, \ldots) \quad (11d)$$

The Boolean B resulting from the application of the conjugation rules can be expressed using a set of instructions of the form $p_k = g(x_i; x_j)$ or $p_k = g(x_i; p_j)$ or $p_k = g(p_i; p_j)$, where the variables $p_k$ are results from intermediate steps in the calculation of B. The list of instructions does not explicitly give the order of evaluation. But the order can be easily determined from the list of instructions. Indeed, there is a simple way to extract an order for the instructions, making it clear that some should be evaluated before others. To construct the order on the set, one proceeds as follows. First, notice that the variables $x_i$ are the inputs to the computation, and it is from them that one computes the $p_k$'s. One then constructs a hierarchy of variables to be computed, in the following order. Step 1: Start with the set $V_0$ containing all the inputs $x_i$. Step 2: Determine all variables that can be computed from those in $V_0$, e.g., those that are the result of some instructions $p_k = g(x_i; x_j)$. These p variables plus the original $x_i$ form the set $V_1$. Step 3: Repeat the following procedure: with the set $V_n$, determine the set $V_{n+1}$ by adding to the set $V_n$, the p variables that are computable using that same set. Stop the repetitions once all the variables used in B are included. The number of rounds to complete the instructions in B is designated n(B).

6. Example Embodiment

Figure 6:
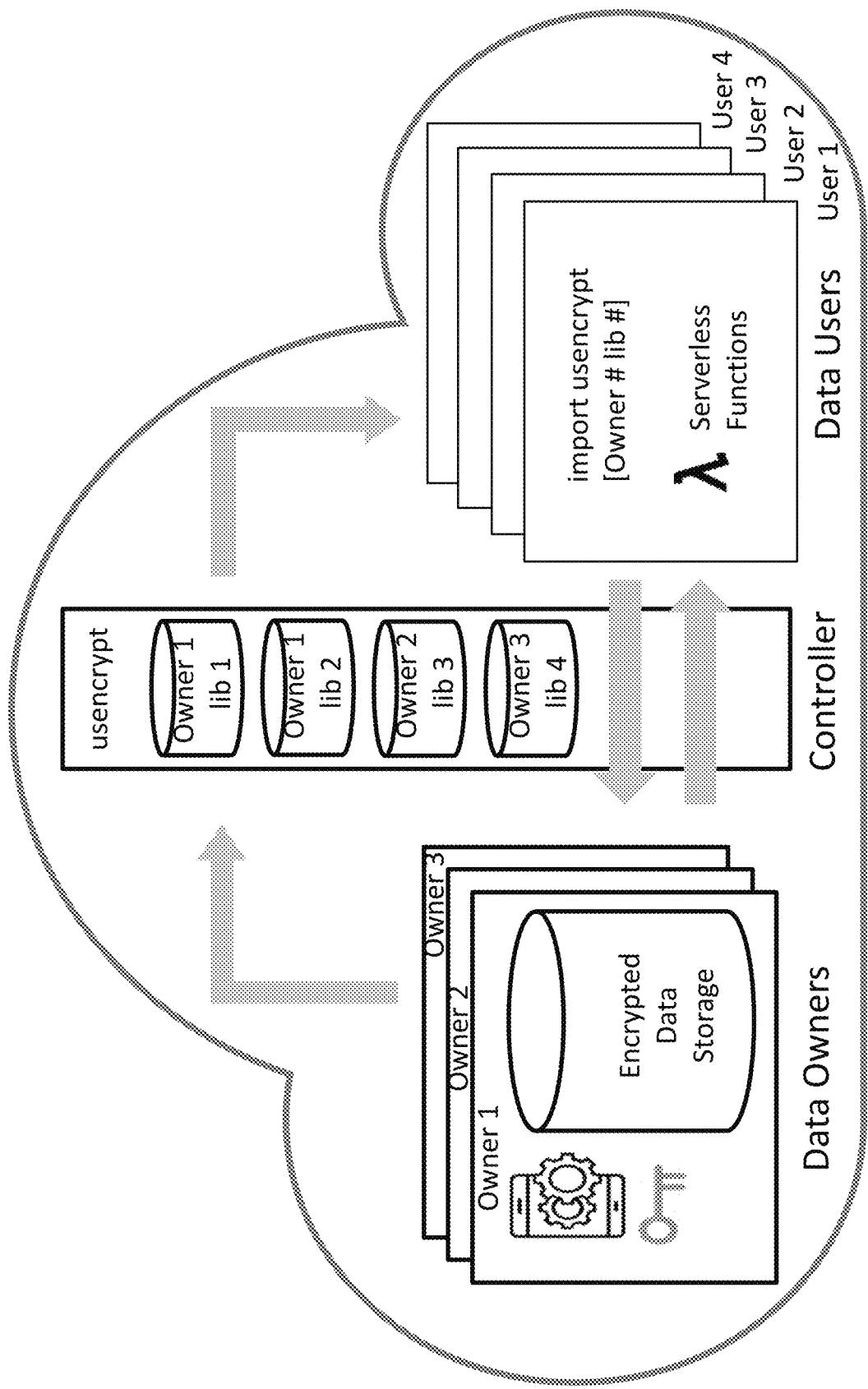
FIG. 6 is a block diagram that illustrates an example system providing encrypted data as a service, according to an embodiment.

FIG. 6 is a block diagram that illustrates an example system providing encrypted data as a service (EDaaS), according to an embodiment. Using various embodiments of EDaaS, Data Owners can: Encrypt their confidential data and make it available for use; Create libraries of functions that can operate on the encrypted data and store them with a Controller; and, Maintain full control over how data gets encrypted and decrypted. Data Users can: Have access to encrypted data and libraries of encrypted data processing functions; Run their algorithms by calling functions to operate on encrypted data, leading to an encrypted result; and, Send requests to Data Owner to decrypt the algorithm results. A Controller chosen by the Data Owner can: Authenticate Data Owners and Users; Provide access to the correct databases of encrypted data and libraries of encrypted data processing functions; and, Monitor and report to Data Owners the usage of functions and data.

In various embodiments, the creation of encrypted data processing functions and libraries are automated and scaled and made efficient to meet entropy targets with satisfactory performance and volume to meet commercial goals. In some embodiments, a user interface is developed to enhance user experience required to increase adoption of the method 400.

Some embodiments involve the encryption of text-based data and operations such as basic and advanced search functions, implemented to search great volumes of text with desirable speed. Some embodiments involve principles of regular expression (regex) in the realm of encrypted data, and are implemented to achieve functionality and performance. Protecting string data and performing fast searches (including fuzzy and partial) are as desirable as protecting numerical data and performing fast operations on numerical data. Both are required to successfully address the challenges anticipated.

7. Computational Hardware Overview

Figure 7:
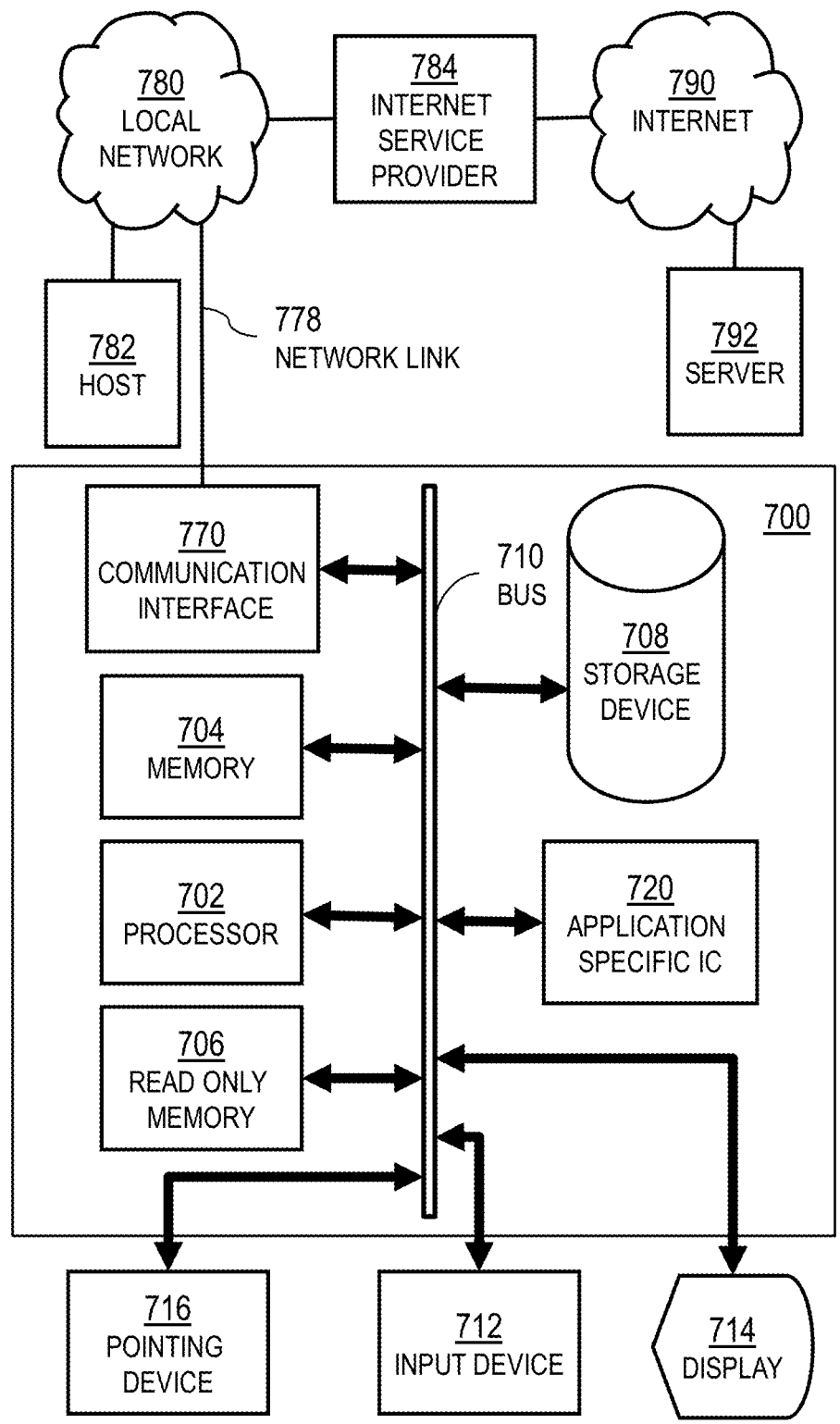
FIG. 7 is a block diagram that illustrates an example computer system upon which an embodiment of the invention may be implemented.

FIG. 7 is a block diagram that illustrates a computer system 700 upon which an embodiment of the invention may be implemented. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, floating array flash memory, SDRAM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC 720.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714. In some circumstances the resources represented by some combination of host 782, local network 780, internet service provider 784, internet 790 and server 792 are termed "the cloud."

The invention is related to the use of computer system 700 for implementing the techniques described herein. According to one embodiment of the invention, those techniques are performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative embodiments, hardware, such as application specific integrated circuit 720, may be used in place of or in combination with software to implement the invention. Thus, embodiments of the invention are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
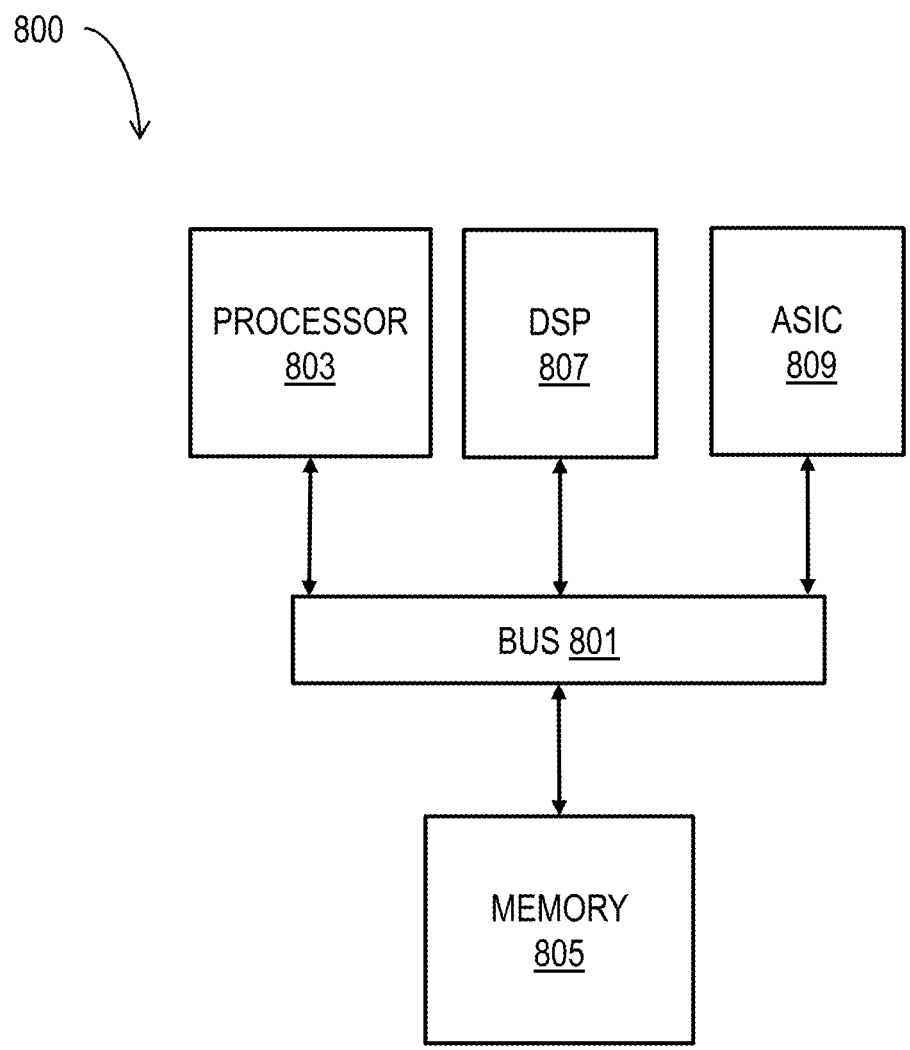
FIG. 8 is a block diagram that illustrates an example chip set upon which an embodiment of the invention may be implemented.

FIG. 8 illustrates a chip set 800 upon which an embodiment of the invention may be implemented. Chip set 800 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of a method described herein.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively, or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

8. Alterations, Deviations and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

9. References

K. Iwama, Y. Kambayashi, and S. Yamashita, Transformation Rules for Designing CNOT-based Quantum Circuits, DAC2002, pp 419-424 (New Orleans, Louisiana, USA, 2002).

C. Chamon and E. Mucciolo, Techniques for Securely Executing Code that Operates on Encrypted Data on a Public Computer, PCT/US18/66019, Publication number WO/2019/126044

What is claimed is:

1. A method operating on a first processor comprising:
receiving first data indicating a sequence of only reversible Boolean function control gates including a first segment for decrypting permutation encrypted data to produce decrypted data, a second segment for operating on the decrypted data to produce one or more resulting decrypted data, and a third segment for encrypting the resulting decrypted data using permutation encryption to produce permutation encrypted resulting data, wherein a Boolean function control gate affects no more than one bit that is called a target bit;
storing on a computer-readable medium second data that indicates generic Boolean function control gate rules for replacing a first sequence of two Boolean function control gates operating on an input N-bit word with a second sequence of one or more Boolean function control gates that produce the same output N-bit word;
using the second data to propagate at least one Boolean function control gate from the first segment to a number J of gates distance into the Boolean function control gates for the second segment or beyond and at least one Boolean function control gate from the third segment to a number K of gates distance into the Boolean function control gates for the second segment or before to produce an obfuscated sequence of reversible Boolean function control gates; and sending obfuscated instructions based on the obfuscated sequence of reversible Boolean function control gates to a second processor for execution.

2. The method as recited in claim 1, wherein at least one Boolean function control gate, of the sequence of reversible Boolean function control gates or of the obfuscated sequence of reversible Boolean function control gates or of both, encodes a plurality of single product control gates.

3. The method as recited in claim 1, wherein the generic Boolean function control gate rules take advantage of simplifications available because a Boolean function control gate has only a single target bit.

4. The method as recited in claim 1, further comprising:
storing on a computer-readable medium third data relating each code instruction in a form executable by the different second processor to one or more reversible Boolean function control gates operating on an N-bit word; and
using the third data to convert the obfuscated sequence of reversible Boolean function control gates to obfuscated code instructions in a form executable by the second processor,
wherein sending obfuscated instructions further comprises sending obfuscated code instructions in a form executable by the second processor.

5. The method as recited in claim 1, wherein:
the method further comprises storing on a computer-readable medium third data relating each code instruction in a form executable by the second processor to one or more reversible Boolean function control gates operating on an N-bit word; and, said receiving first data further comprises:
receiving code instructions in a form executable by the second processor for operating on the encrypted data to produce one or more resulting decrypted data; and,
using the third data to convert the code instructions in a form executable by the second processor for operating on the encrypted data to produce one or more resulting decrypted data to the sequence of reversible Boolean function control gates for operating on the encrypted data to produce one or more resulting decrypted data.

6. The method as recited in claim 1, further comprising:
storing on a computer-readable medium fusion data that indicates rules for replacing each of one or more sequences of reversible Boolean function control gates operating on an input N-bit word to produce an output N-bit word, with one or more reversible k-bit gates (wherein 1≤k≤N) that produce a same output N-bit word; and
using the fusion data to replace a particular sequence of one or more reversible Boolean function control gates of the obfuscated sequence of reversible Boolean function control gates with a k-bit gate that can replace the particular sequence.

7. The method as recited in claim 6, further comprising:
storing on a computer-readable medium third data relating each code instruction in a form executable by the different second processor to one or more reversible Boolean function control gates operating on an N-bit word;

storing on a computer-readable medium fusion code data relating each of the one or more k-bit gates with one or more code instructions for the different second processor;
using the fusion code data to convert the k-bit gate to at least part of obfuscated code instructions; and
using the third data to convert any remaining reversible Boolean function control gates of the obfuscated sequence of reversible Boolean function control gates to any remaining part of the obfuscated code instructions,
wherein sending obfuscated instructions further comprises sending obfuscated code instructions in a form executable by the second processor.

8. The method as recited in claim 1, wherein J>N and K>N.

9. The method as recited in claim 1, wherein the second processor is different from the first processor.

10. The method as recited in claim 1, wherein access to the second processor is different from access to the first processor.

11. A non-transitory computer-readable medium carrying one or more sequences of instructions, wherein execution of the one or more sequences of instructions by a first set of one or more processors causes the first set of one or more processors to perform the steps of:
receiving first data indicating a sequence of only reversible Boolean function control gates including a first segment for decrypting permutation encrypted data to produce decrypted data, a second segment for operating on the decrypted data to produce one or more resulting decrypted data, and a third segment for encrypting the resulting decrypted data using permutation encryption to produce permutation encrypted resulting data, wherein a Boolean function control gate affects no more than one bit that is called a target bit;
storing second data that indicates rules for replacing a first sequence of two reversible Boolean function control gates operating on an input N-bit word with a second sequence of one or more reversible Boolean function control gates that produce the same output N-bit word;
using the second data to propagate at least one Boolean function control gate from the first segment to a number J of gates distance into the Boolean function control gates for the second segment or beyond and at least one Boolean function control gate from the third segment to a number K of gates distance into the Boolean function control gates for the second segment or before to produce an obfuscated sequence of reversible Boolean function control gates; and
sending obfuscated instructions based on the obfuscated sequence of reversible Boolean function control gates to a second set of one or more processors for execution.

12. The non-transitory computer-readable medium as recited in claim 11,
wherein execution of the one or more sequences of instructions further causes the first set of processors to perform the steps of:
storing on a computer-readable medium third data relating each code instruction in a form executable by the different second processor to one or more reversible Boolean function control gates operating on an N-bit word; and
using the third data to convert the obfuscated sequence of reversible Boolean function control gates to obfuscated code instructions in a form executable by the second processor, wherein sending obfuscated instructions further comprises sending obfuscated code instructions in a form executable by the second processor.

13. The non-transitory computer-readable medium as recited in claim 11, wherein:
execution of the one or more sequences of instructions further causes the first set of processors to perform storing on a computer-readable medium third data relating each code instruction in a form executable by the second processor to one or more reversible Boolean function control gates operating on an N-bit word; and,
said receiving first data further comprises:
receiving code instructions in a form executable by the second processor for operating on the encrypted data to produce one or more resulting decrypted data; and,
using the third data to convert the code instructions in a form executable by the second processor for operating on the encrypted data to produce one or more resulting decrypted data to the sequence of reversible Boolean function control gates for operating on the encrypted data to produce one or more resulting decrypted data.

14. The non-transitory computer-readable medium as recited in claim 11, wherein execution of the one or more sequences of instructions further cause the first set of processors to perform:
storing on a computer-readable medium fusion data that indicates rules for replacing each of one or more sequences of reversible Boolean function control gates operating on an input N-bit word to produce an output N-bit word, with one or more reversible k-bit gates (wherein 1≤k≤N) that produce a same output N-bit word; and
using the fusion data to replace a particular sequence of one or more reversible Boolean function control gates of the obfuscated sequence of reversible Boolean function control gates with a k-bit gate that can replace the particular sequence.

15. The non-transitory computer-readable medium as recited in claim 11, wherein execution of the one or more sequences of instructions further causes the first set of processors to perform:
storing on a computer-readable medium third data relating each code instruction in a form executable by the different second processor to one or more reversible Boolean function control gates operating on an N-bit word;
storing on a computer-readable medium fusion code data relating each of the one or more k-bit gates with one or more code instructions for the different second processor;
using the fusion code data to convert the k-bit gate to at least part of obfuscated code instructions; and
using the third data to convert any remaining reversible Boolean function control gates of the obfuscated sequence of reversible Boolean function control gates to any remaining part of the obfuscated code instructions,
wherein sending obfuscated instructions further comprises sending obfuscated code instructions in a form executable by the second processor.

16. A system comprising:
a first set of at least one processor; and
at least one memory including one or more sequences of instructions, the at least one memory and the one or more sequences of instructions configured to, with the at least one processor, cause an apparatus to perform at least the following,
receiving first data indicating a sequence of only reversible Boolean function control gates including a first segment for decrypting permutation encrypted data to produce decrypted data, a second segment for operating on the decrypted data to produce one or more resulting decrypted data, and a third segment for encrypting the resulting decrypted data using permutation encryption to produce permutation encrypted resulting data, wherein a Boolean function control gate affects no more than one bit that is called a target bit;
storing on the computer-readable medium second data that indicates rules for replacing a first sequence of two Boolean function control gates operating on an input N-bit word with a second sequence of one or more Boolean function control gates that produce the same output N-bit word;
using the second data to propagate at least one Boolean function control gate from the first segment to a number J of gates distance into the Boolean function control gates for the second segment or beyond and at least one Boolean function control gate from the third segment to a number K of gates distance into the Boolean function control gates for the second segment or before to produce an obfuscated sequence of reversible Boolean function control gates; and
sending obfuscated instructions based on the obfuscated sequence of reversible Boolean function control gates to a second set of at least one processor for execution.

17. The system as recited in claim 16, wherein the at least one memory and the one or more sequences of instructions are further configured to cause an apparatus to perform:
storing on a computer-readable medium third data relating each code instruction in a form executable by the different second processor to one or more reversible Boolean function control gates operating on an N-bit word; and
using the third data to convert the obfuscated sequence of reversible Boolean function control gates to obfuscated code instructions in a form executable by the second processor,
wherein sending obfuscated instructions further comprises sending obfuscated code instructions in a form executable by the second processor.

18. The system as recited in claim 16, wherein:
the at least one memory and the one or more sequences of instructions are further configured to cause an apparatus to perform storing on a computer-readable medium third data relating each code instruction in a form executable by the second processor to one or more reversible Boolean function control gates operating on an N-bit word; and,
said receiving first data further comprises:
receiving code instructions in a form executable by the second processor for operating on the encrypted data to produce one or more resulting decrypted data; and,
using the third data to convert the code instructions in a form executable by the second processor for operating on the encrypted data to produce one or more resulting decrypted data to the sequence of reversible Boolean function control gates for operating on the encrypted data to produce one or more resulting decrypted data.

19. The system as recited in claim 16, wherein the at least one memory and the one or more sequences of instructions are further configured to cause an apparatus to perform:
storing on a computer-readable medium fusion data that indicates rules for replacing each of one or more sequences of reversible Boolean function control gates operating on an input N-bit word to produce an output N-bit word, with one or more reversible k-bit gates (wherein $1 \leq k \leq N$) that produce a same output N-bit word; and using the fusion data to replace a particular sequence of one or more reversible Boolean function control gates of the obfuscated sequence of reversible Boolean function control gates with a k-bit gate that can replace the particular sequence.

20. The system as recited in claim 19, wherein the at least one memory and the one or more sequences of instructions are further configured to cause an apparatus to perform:

storing on a computer-readable medium third data relating each code instruction in a form executable by the different second processor to one or more reversible Boolean function control gates operating on an N-bit word;

storing on a computer-readable medium fusion code data relating each of the one or more k-bit gates with one or more code instructions for the different second processor;

using the fusion code data to convert the k-bit gate to at least part of obfuscated code instructions; and using the third data to convert any remaining reversible Boolean function control gates of the obfuscated sequence of reversible Boolean function control gates to any remaining part of the obfuscated code instructions, wherein sending obfuscated instructions further comprises sending obfuscated code instructions in a form executable by the second processor.

* * * * *